US010368313B2

(12) United States Patent
Lippman

(10) Patent No.: US 10,368,313 B2
(45) Date of Patent: Jul. 30, 2019

(54) SYSTEM, METHOD AND APPARATUS FOR BATTERY ALLOCATION

(71) Applicant: Zebra Technologies Corporation, Lincolnshire, IL (US)

(72) Inventor: Devan J. Lippman, Cumberland, RI (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 15/799,606

(22) Filed: Oct. 31, 2017

(65) Prior Publication Data
US 2019/0132799 A1 May 2, 2019

(51) Int. Cl.
H04W 52/02 (2009.01)
G06F 1/3212 (2019.01)
H02J 7/00 (2006.01)
H02J 1/14 (2006.01)

(52) U.S. Cl.
CPC ...... H04W 52/0277 (2013.01); G06F 1/3212 (2013.01); H02J 1/14 (2013.01); H02J 7/0019 (2013.01); H02J 7/0027 (2013.01); H02J 7/0047 (2013.01)

(58) Field of Classification Search
CPC ..... H04W 52/0277; H02J 7/0019; H02J 1/14; H02J 7/0047; H02J 7/0027; G06F 1/3212
See application file for complete search history.

(56) References Cited

U.S. PATENT DOCUMENTS

| 8,805,457 | B2 | 8/2014 | Sarker et al. |
| 9,288,763 | B1* | 3/2016 | Zhao ................. H04W 52/0261 |
| 9,329,816 | B2 | 5/2016 | Berarducci et al. |
| 9,335,958 | B2 | 5/2016 | Anno et al. |
| 9,772,672 | B2* | 9/2017 | Li ............................. G06F 1/30 |
| 9,817,947 | B2 | 11/2017 | Hermans et al. |
| 9,939,868 | B2* | 4/2018 | Shuster ............. H04M 1/72563 |
| 9,955,428 | B1* | 4/2018 | Bacarella .......... H04W 52/0258 |
| 10,032,120 | B2 | 7/2018 | Collins et al. |
| 2008/0109114 | A1* | 5/2008 | Orita ...................... B25J 19/005 700/248 |
| 2011/0029157 | A1* | 2/2011 | Muzaffer .............. B60L 3/0046 701/2 |

(Continued)

Primary Examiner — Nha T Nguyen

(57) ABSTRACT

A server for allocating a rechargeable battery among a plurality of roles performed by a group of devices removably connectable with the rechargeable battery, receives for each role from a subgroup of devices, data sets corresponding to respective operational periods. Each data set includes an identifier of the rechargeable battery; a measured capacity; and a measured energy consumption during the operational period. The server: determines and stores, based on the measured capacities, a predicted capacity of the rechargeable battery; determines and stores, for each role, a predicted energy consumption per role based on the measured energy consumptions; obtains an allocation defined by the identifier of the rechargeable battery and an identifier of one of the roles; compares the predicted capacity with the predicted energy consumption corresponding to the obtained role; and when the predicted energy consumption corresponding to the one of the roles exceeds the predicted capacity, generates an alert.

18 Claims, 8 Drawing Sheets

(56) References Cited

U.S. PATENT DOCUMENTS

| | | | | |
|---|---|---|---|---|
| 2014/0095091 A1* | 4/2014 | Moore | ............... | H04Q 9/00 |
| | | | | 702/63 |
| 2015/0323974 A1* | 11/2015 | Shuster | ............ | H04M 1/72563 |
| | | | | 713/320 |
| 2016/0062429 A1* | 3/2016 | Cudak | ............... | G06F 1/26 |
| | | | | 713/300 |

* cited by examiner

SYSTEM, METHOD AND APPARATUS FOR BATTERY ALLOCATION

BACKGROUND

Encoding devices, such as portable label printers, may be employed under a variety of conditions. The encoding devices are typically powered by rechargeable batteries, which may be inefficiently deployed relative to the above-mentioned conditions.

DETAILED DESCRIPTION

Various devices, including encoding devices such as label printers, are powered by rechargeable batteries. The batteries may be selected and connected to devices at the start of an operational period (e.g. a shift in a warehouse). When the capacity of a battery is not sufficient to power a device for the entire operational period, downtime may be required to recharge or replace the battery.

A battery that experiences an outage as described above may be discarded (e.g. due to degraded ability to retain a charge). However, capacity degradation may occur over an extended period of time (e.g. a number of shifts). Further, a given environment or collection of environments under the same management may include various roles to which the devices are assigned. Some roles may be more demanding than others (e.g. print different label types, greater volumes of labels per shift, and so on). Batteries may be discarded when they cease to be capable of supporting more demanding roles, but could still support less demanding roles. Conversely, batteries may be retained following use in less demanding roles, and then deployed in more demanding roles only to fail and cause outages. In other words, battery deployment in such environments may lead to costly inefficiencies in the form of downtime and prematurely discarded batteries.

Examples disclosed herein are directed to a method in a server for allocating a rechargeable battery among a plurality of roles performed by a group of devices removably connectable with the rechargeable battery, including: for each of the roles, receiving, from a subgroup of the devices, a plurality of data sets corresponding to respective operational periods, each data set including: an identifier of the rechargeable battery; a measured capacity of the rechargeable battery; a measured energy consumption during the operational period; and determining, based on the measured capacities, a predicted capacity of the rechargeable battery and storing the predicted capacity in association with the identifier of the rechargeable battery; determining, for each role, a predicted energy consumption based on the measured energy consumptions and storing the predicted energy consumption in association with an identifier of the role; obtaining an allocation defined by the identifier of the rechargeable battery and an identifier of one of the roles; comparing the predicted capacity with the predicted energy consumption corresponding to the one of the roles; and when the predicted energy consumption corresponding to the one of the roles exceeds the predicted capacity, generating an alert.

Figure 1:
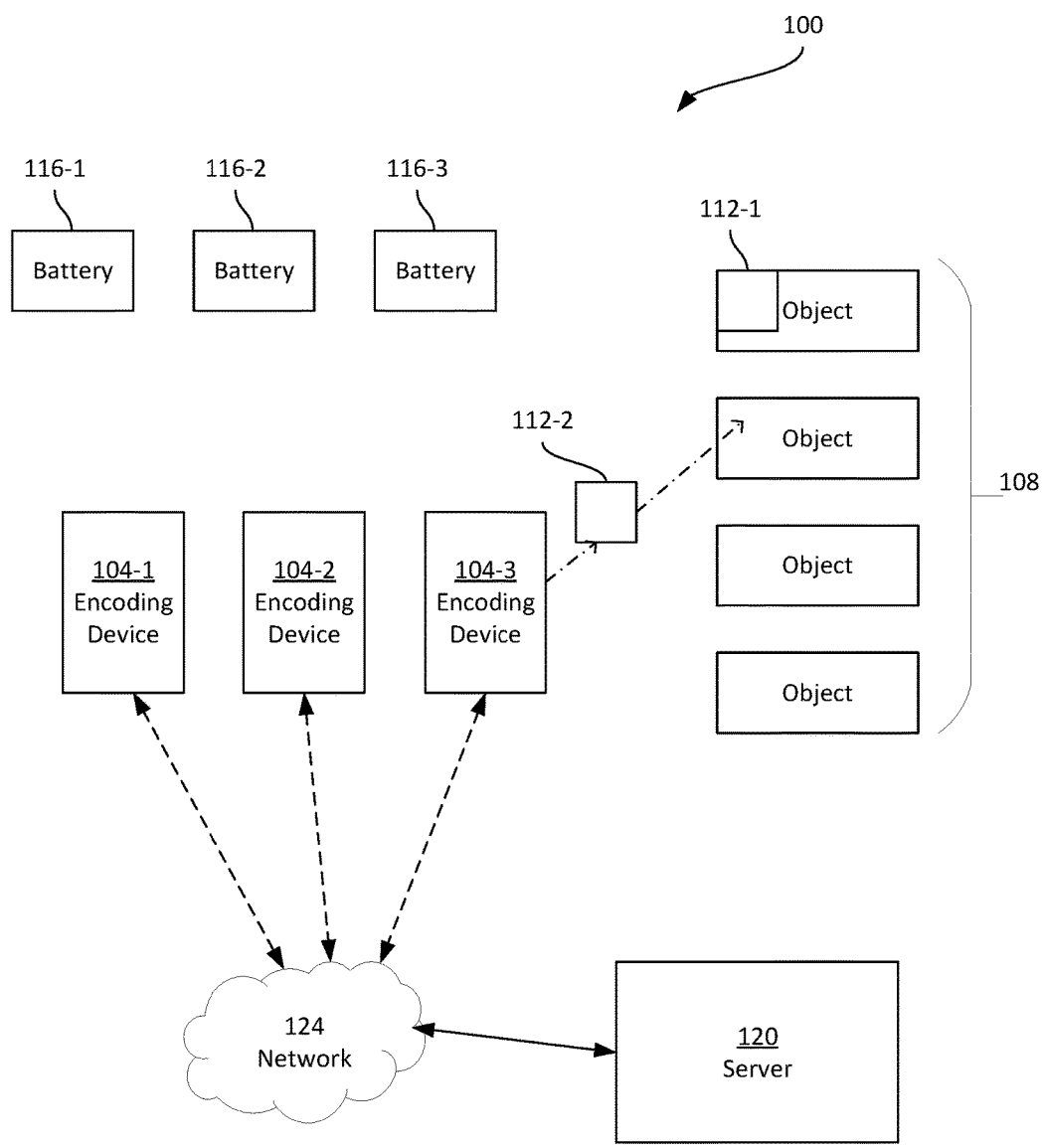
FIG. 1 depicts a system.

FIG. 1 depicts an example system 100 constructed in accordance with the teachings of this disclosure. The system 100 includes a plurality of encoding devices (also referred to herein simply as devices), of which three example devices 104-1, 104-2 and 104-3 (collectively referred to as the devices 104, and generically as a device 104; this nomenclature is also employed herein in connection with other elements) are illustrated. The encoding devices 104 are deployed within any suitable set of environments, including warehouses, production lines, retail environments, and the like, to perform encoding tasks with respect to sets of objects such as the set of objects 108 shown in FIG. 1. The nature of the objects 108 varies with the environment (or environments) in which the devices 104 are deployed. For example, the objects 108 can include boxes, pallets and the like in a warehouse. The encoding tasks performed by the devices 104, in general, associate data with one or more of the objects 108. For example, as shown in FIG. 1, each device 104 is implemented as a label printer, and is therefore configured to print a label 112 to be affixed to an object 108. A label 112-1 is shown having already been placed on an object 108, and a further label 112-2 is shown having been generated (e.g. printed) by the device 104-3 for placement on another object 108.

The labels 112 are, in some examples, labels bearing any one of, or any suitable combination of, barcodes, product names, product numbers, serial numbers, quantities, shipping information (e.g. destination mailing addresses), stock keeping numbers, production information (e.g. lot numbers, manufacturer codes, and production dates), and the like. In other examples, the encoding tasks performed by the devices 104 include writing data to radio frequency identification (RFID) tags previously placed on the objects 108. In further examples, the devices 104 are configured to perform both label impression and RFID tag encoding (e.g., the labels printed by each device 104 may include RFID tags embedded therein, which the devices write data to substantially simultaneously with label impression).

In some examples, the devices 104 are employed to perform tasks other than the encoding tasks mentioned above. For example, the devices 104 may be handheld tools such as nail-guns, drills and the like (e.g. for use on a production line), mobile devices such as mobile computers, smartphones, scanners, handheld RFID readers and the like, agricultural equipment such as hedge trimmers, cleaning equipment, or other devices. More generally, the devices 104 are deployed to perform a set of tasks that consume energy. Typically, each device 104 is operated to repeat a given task over the course of an operational period, such as a shift (e.g. a continuous period of eight hours).

The energy required to perform the above-mentioned tasks is provided by a set of rechargeable batteries, of which three examples 116-1, 116-2 and 116-3 are shown. Although the number of batteries 116 shown in FIG. 1 is equal to the number of devices 104 in the system 100 as illustrated in FIG. 1, in other examples the system 100 may include a different number of batteries 116 from the number of devices 104. Each rechargeable battery 116 is removably connectable with a device 104 to supply power to the device 104. In the present example, the batteries 116 and the devices 104 are interchangeable. That is, each battery 116 may be connected to any of the devices 104 for a given operational period. Although the batteries 116 are shown in FIG. 1 as being removably connectable with the devices 104, in other examples one or more of the batteries 116 may be integrated with corresponding devices 104. That is, each battery 116 can be coupled with a particular device 104 in such a manner that removal of the battery 116 from the corresponding device 104 is difficult or impossible without damaging one or both of the battery 116 and the device 104.

As will be discussed below in greater detail, each battery 116 includes an identifier that distinguishes the battery 116 from the other batteries 116 in the system 100. The identifier may therefore be referred to as a unique identifier, although it will be understood that the identifier may not be truly unique. For example, a distinct deployment of a system according to the teachings herein may employ battery identifiers that coincide with those in the system 100. Further, one or more batteries lacking the above-mentioned identifiers (not shown) may be deployed alongside the batteries 116 in the system 100 and employed to power the devices 104. That is, the batteries 116 (which do have the above-mentioned identifiers) represent a subset, up to and including the entirety, of the population of batteries in the system 100. The monitoring functionality described herein is typically not deployed for any batteries without identifiers deployed in the system 100.

Further, in the illustrated example, each device 104 is configured to report the above-mentioned battery identifier corresponding to the battery currently connected to the device 104, as well as various measurements obtained by the device 104 during the above-mentioned operational periods, to a server 120. The devices 104, in the present example, report data to the server 120 via a wireless network 124, such as a wireless local area network (WLAN) implemented in the operational environment in which the devices 104 are deployed. In examples in which the devices are deployed to different physical locations, a plurality of networks 124, including both LANs and wide-area networks (WAN), are employed to transfer data from the devices 104 to the server 120.

The example server 120 of FIG. 1, as will be discussed herein, is configured to receive the above-mentioned data reported by the devices, and based on that data to determine (and update based on subsequent reported data) predicted performance metrics corresponding to both the batteries 116 and the functional roles in which the devices 104 are deployed. The server is further configured to generate alerts corresponding to the batteries 116, for example when a comparison of the above-mentioned predicted performance metrics reveals that a given battery 116 is likely to fail during a future operational period (i.e., to have insufficient capacity to power a device 104 for the entire operational period).

Figure 2A:
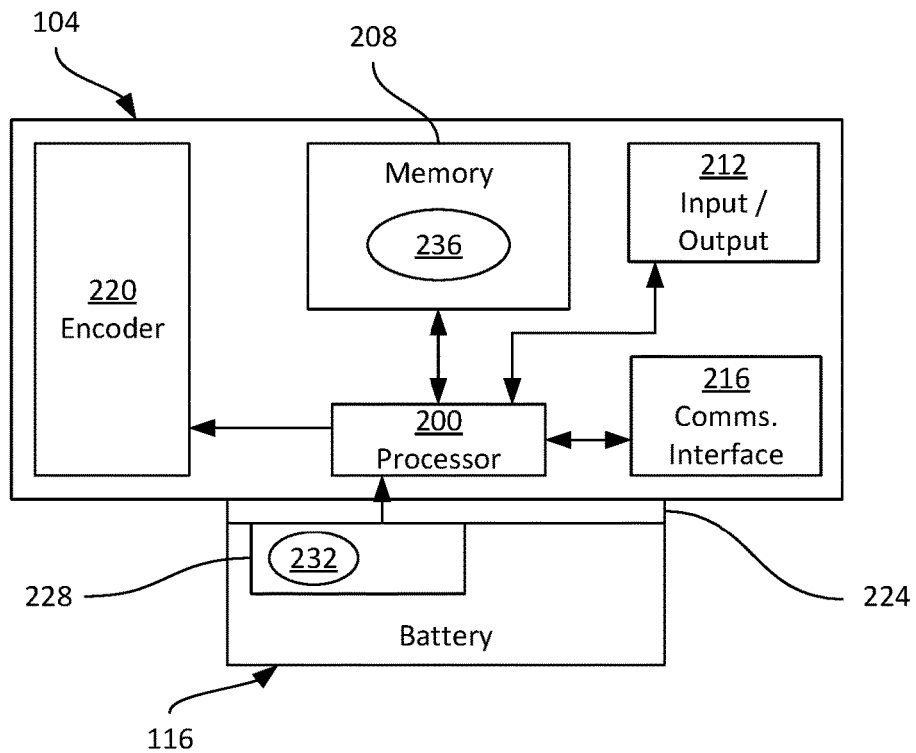
FIGS. 2A and 2B are block diagrams of certain internal hardware components of the encoding devices and the server of FIG. 1, respectively.

Referring to FIG. 2A, a schematic diagram of certain components of a device 104 is shown. Each of the example devices 104 shown in FIG. 1 includes the example components shown in FIG. 2A. Typically, the group of devices 104 under management by a given server 120 is substantially identical, although it will be understood that certain specific structural features of the devices 104 may vary (e.g., form factor, communications technology employed to communicate with the server 120 and the like).

The example device 104 of FIG. 2A includes a central processing unit (CPU), also referred to as a processor 200 interconnected with a non-transitory computer readable storage medium, such as a memory 208. The memory 208 includes any suitable combination of volatile (e.g. Random Access Memory (RAM)) and non-volatile (e.g. read only memory (ROM), Electrically Erasable Programmable Read Only Memory (EEPROM), flash) memory. The processor 200 and the memory 208 each comprise one or more integrated circuits (ICs).

The device 104 also includes at least one input device, and at least one output device, illustrated in FIG. 2A as an input/output device 212 interconnected with the processor 200. The input device includes any suitable one, or any suitable combination of, a touch screen, a keypad, a trigger (e.g. to initiate the performance of any encoding task), and the like. The output device includes any suitable one, or any suitable combination of a display (e.g., integrated with the above-mentioned touch screen), a speaker, and the like. The input/output device 212 is configured to receive input and provide data representative of the received input to the processor 200, and to receive output from the processor 200 and present the output, e.g. via the emission of sound from the speaker, the rendering of visual indications on the display, and the like.

The device 104 also includes a communications interface 216, enabling the device 104 to exchange data with other computing devices, such as the server 120. The communications interfaces 216 includes any suitable hardware (e.g. transmitters, receivers, network interface controllers and the like) allowing the device 104 to communicate, e.g. with the server 120, over the network 124.

The device 104 also includes an encoder assembly 220 in the present example. The encoder assembly 220 (also referred to simply as the encoder 220) is configured to perform one or more of the above-mentioned encoding tasks. Thus, in some examples, the encoder 220 includes a label printer comprising a supply of media (e.g., a roll of blank labels, receipt paper, tags, wristbands, RFID tags, magnetic stripe cards), a print head and supporting components for feeding the media to an exit defined in the housing (not shown) of the device 104 via the print head for impression. In other examples, the encoder 220 includes a RFID writer instead of, or in addition to, the above-mentioned label printer. In still further examples, the encoder 220 is replaced or supplemented with another functional assembly, such as a motor for a drill or the like. In other examples, the encoder 220 is replaced by, or supplemented with, a decoder such as a barcode reader (e.g. a structured light scanner, an imaging module or the like), an RFID reader, or the like. Each device 104 in the system 100 need not have the same functional assembly as the other devices 104.

The components of the device 104 are interconnected by communication buses (not shown), and powered by the above-mentioned buses are separate power buses (not shown), which transmit electrical power to the components from a battery 116 releasably connected to the device 104 via a battery interface 224 (e.g. a set of structures configured to both retain the battery 116 and connect leads of the battery 116 with electrical terminals of the device 104). As noted earlier, in other examples some batteries 116 are not readily removable from corresponding devices 104, or are not removable without damaging one or both of the battery 116 and the device 104. The battery 116 itself, as shown in FIG. 2A, includes a controller 228 which may also be referred to as a fuel gauge. The controller 228 is configured to report battery status data to the processor 200 at predefined intervals (which may also be configurable). For example, the controller 228 can be configured to report the current charge level of the battery 116 to the processor 200 at intervals of ten seconds. In another example, the controller 228 is configured to report the current charge level of the battery 116 to the processor 200 at intervals of less than ten seconds (e.g., at intervals of five seconds). In further examples, the controller 228 is configured to report the current charge level of the battery 116 to the processor 200 at intervals of more than ten seconds (e.g. thirty seconds). The controller 228 also stores, in a memory thereof, an identifier 232 of the battery 116. The identifier is any suitable alphanumeric string sufficient to distinguish the battery 116 from the other batteries 116 in the system 100.

In other examples, the controller 228 is located on the device 104 itself, rather than on the battery 116. In such examples, the battery 116 nevertheless includes the above-mentioned memory storing the identifier 232. The processor 200 of the device 104 is configured to obtain (whether by querying the memory of the battery 116 or via receipt from the controller 228) the identifier 232 as well as the above-mentioned status data.

The memory 208 of the device 104 stores a plurality of applications, each including a plurality of computer readable instructions executable by the processor 200. The execution of the above-mentioned instructions by the processor 200 causes the device 104 to implement certain functionality, as discussed herein. The applications are therefore said to be configured to perform that functionality in the discussion below. In the present example, the memory 208 of the device 104 stores an encoding application 236, also referred to herein as the application 236. The device 104 is configured, via execution of the application 236 by the processor 200, to control the encoder 220 to perform one or more of the above-mentioned encoding tasks, for example in response to a command received from the input/output device 212. The device 104 is also configured via execution of the application 236 by the processor 200 to report the above-mentioned battery status data to the server 120 via the communications interface 216. The data reported to the server 120, as will be discussed below, typically also includes an identifier of the device 104 (e.g. a media access control (MAC) address or other identifier that distinguishes the device 104 from other devices 104 in the system 100) as well as the identifier 232.

Figure 2B:
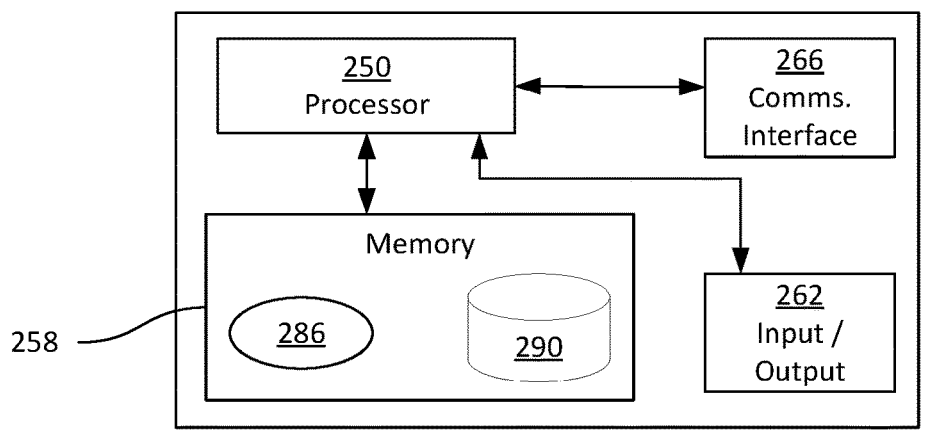

Turning to FIG. 2B, a schematic diagram of certain components of the server 120 is shown. The server 120 includes a central processing unit (CPU), also referred to as a processor 250 interconnected with a non-transitory computer readable storage medium, such as a memory 258. The memory 258 includes any suitable combination of volatile (e.g. Random Access Memory (RAM)) and non-volatile (e.g. read only memory (ROM), Electrically Erasable Programmable Read Only Memory (EEPROM), flash) memory. The processor 250 and the memory 258 each comprise one or more integrated circuits (ICs).

The server 120 also includes at least one input device, and at least one output device, illustrated in FIG. 2B as an input/output device 262 interconnected with the processor 250. The input device includes any suitable one, or any suitable combination of, a keyboard, a mouse, and the like. The output device includes any suitable one, or any suitable combination of a display, a speaker, and the like. The input/output device 262 is configured to receive input and provide data representative of the received input to the processor 250, and to receive output from the processor 250 and present the output, e.g. via the emission of sound from the speaker, the rendering of visual indications on the display, and the like. In other examples, the input/output device 262 is physically distinct from the server 120. For example, the input/output device 262 may be connected to the processor 250 via the network 124 and another computing device (not shown).

The server 120 also includes a communications interface 266, enabling the server 120 to exchange data with other computing devices, such as the devices 104. The communications interfaces 266 includes any suitable hardware (e.g. transmitters, receivers, network interface controllers and the like) allowing the server 120 to communicate, e.g. with the devices 104, over the network 124.

The memory 258 of the server 120 stores a plurality of applications, each including a plurality of computer readable instructions executable by the processor 250. The execution of the above-mentioned instructions by the processor 250 causes the server 120 to implement certain functionality, as discussed herein. The applications are therefore said to be configured to perform that functionality in the discussion below. In the present example, the memory 258 of the server 120 stores an asset management application 286, also referred to herein as the application 286. The memory 258 also stores a repository 290 containing the above-mentioned status data received from the devices 104, as well as further data derived from the status data by the processor 250.

The server 120 is configured, via execution of the application 286 by the processor 250, to receive and store the status data reported by the devices 104, to derive certain performance metrics from the received status data, and to generate alerts when certain conditions are met by the performance metrics. The functionality implemented by the server 120 will be described in greater detail below, following a discussion of certain components of the application 286, with reference to FIG. 3.

Figure 3:
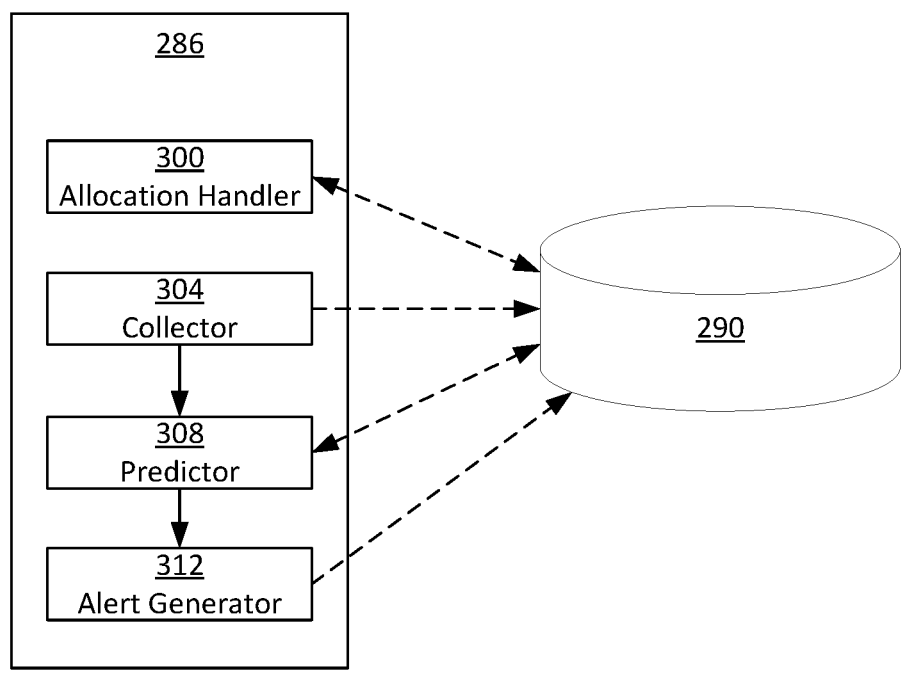
FIG. 3 is a block diagram of certain internal components of the server of FIG. 1.

Referring to FIG. 3, certain components of the application 286 are illustrated. In some examples, the components of the application 286 are implemented as distinct, interacting applications rather than as parts of the application 286. Further, in some examples, some or all of the components of the application 286 are implemented as discrete hardware elements, such as application-specific integrated circuits (ASICs), field-programmable gate arrays (FPGAs) and the like.

The example application 286 of FIG. 3 includes an allocation handler 300, configured to obtain battery allocations. A battery allocation (also referred to as an allocation) is an association between a battery 116 and a role identifier. As will be discussed in greater detail below, the devices 104 can be assigned to any one of a plurality of roles within the operating environment. In general, a role defines a set of operational requirements to be fulfilled by the device 104 during an operational period. The operational requirements can include any one or more of a location (e.g. a specific warehouse within the system 100, or a certain area within a given warehouse), a type of encoding task to perform (e.g. a type of label to print), a type of object upon which to perform the encoding task (e.g. some devices 104 may be assigned to printing labels for placement on a first product in a warehouse, and other devices 104 may be assigned to printing the labels on a second product in the warehouse). Role assignments for the devices 104 are stored in the repository 290. The allocation handler 300 is configured to determine an allocation for a given battery 116 based on the role currently assigned to the device 104 with which the battery 116 is connected.

As will be apparent from the above, a wide variety of roles may be assigned to the devices 104. A first example role includes deploying a device 104 to label objects in a warehouse receiving location. The first example role may require the device to read about one hundred RFID tags per shift (e.g., eight hours), print about one thousand labels (e.g., 4×2-inch labels) per shift, and to operate a Wi-Fi radio for a first portion of each shift (e.g. four hours) and a Bluetooth radio for a remainder of the shift. A second example role includes deploying a device 104 to label objects in a warehouse shipping location, in which the device 104 may be required to read about fifty RFID tags and print about fifty labels (e.g. 4×6-inch labels) per shift, and to operate a Wi-Fi radio for at least a portion (e.g., six hours) of each shift. A third example role includes deploying a device 104 in a picking function, in which both Wi-Fi and Bluetooth radios are operated for the duration of each shift. A fourth example role includes deploying a device 104 in a warehouse receiving location, in which the device 104 is required to read about two hundred RFID tags and scan about seven hundred barcodes per shift, as well as to operate a Wi-Fi radio for a first portion of each shift (e.g. four hours) and a Bluetooth radio for a remainder of the shift. A fifth example role includes deploying a device 104 (e.g., a drill) on an assembly line in which the device 104 is required to perform about two thousand drilling tasks per shift. A sixth example role includes deploying a device 104 (e.g., a hedge-trimmer) for grounds-keeping, in which the device 104 is required to trim about one thousand square feet of hedge per shift. Additional example roles will be apparent from the above examples. Some or all of the operational requirements mentioned above (e.g., numbers of labels printed) need not be explicitly defined at the server 120 or the devices 104, as will be discussed below.

The example application 286 of FIG. 3 also includes a collector 304 configured to receive the above-mentioned status data from the devices 104 and to store the status data in the repository 290 for further processing. The application 286 also includes a predictor 308 configured to generate predicted performance metrics associated with one or both of the batteries 116 and the above-mentioned roles. The predicted performance metrics are also stored in the repository 290. The application 286 also includes an alert generator 312 configured to evaluate the above-mentioned status data relative to the predicted performance metrics and to generate one or more alerts when certain preconfigured conditions are met by the status data. In general, the application 286 is configured to collect status data from the devices 104, derive battery-specific and role-specific performance metrics from the status data, and generate predictions and alerts corresponding to the expected future performance of the batteries 116 that may permit more efficient deployment of the batteries 116 in the system 100.

Figure 4:
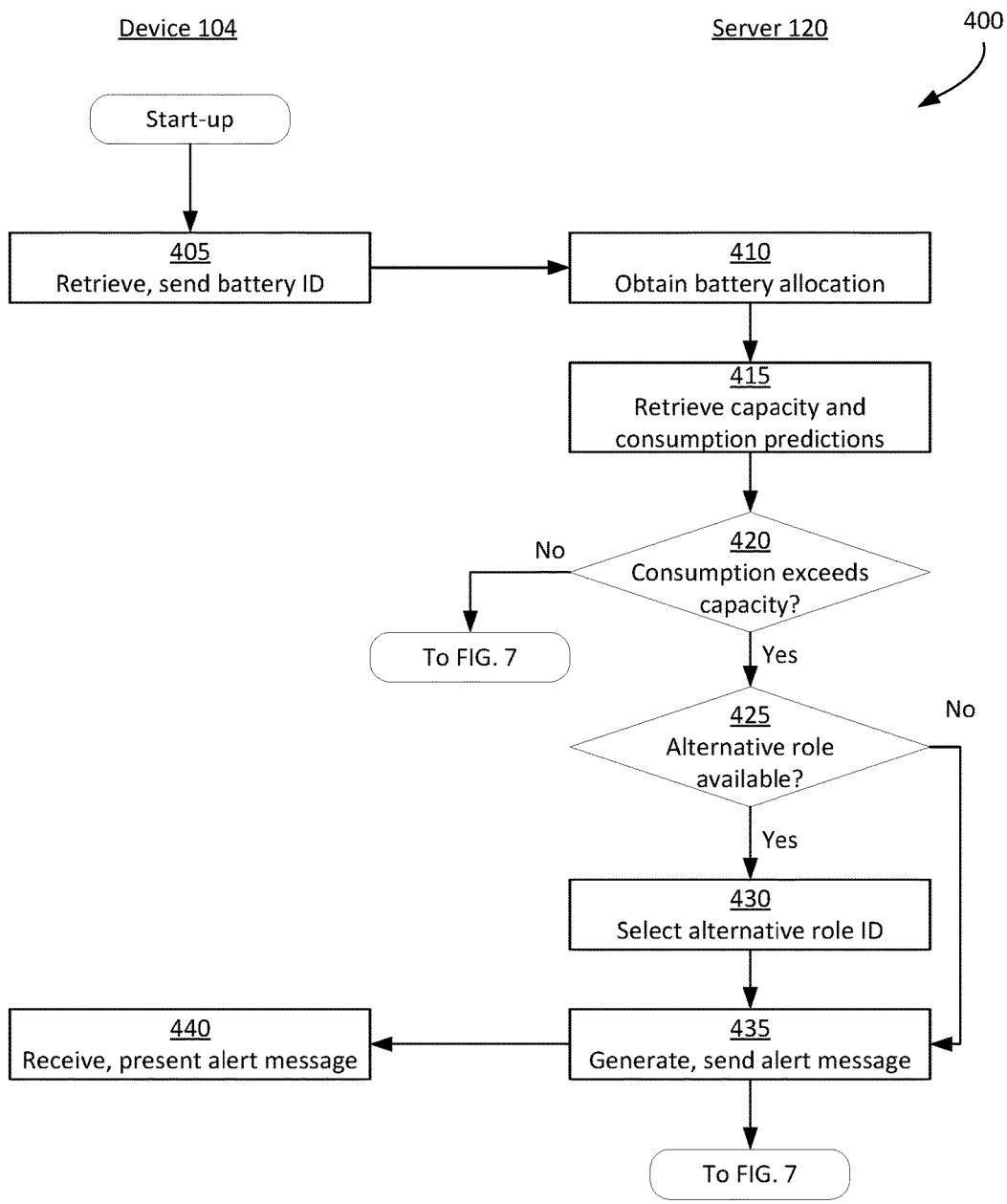
FIG. 4 is a flowchart of a method of battery allocation.

Turning now to FIG. 4, an example method 400 of allocating a rechargeable battery among a plurality of roles is illustrated in accordance with the teachings of this disclosure. As illustrated in FIG. 4, certain blocks of the method 400 are performed by the devices 104, while other blocks of the method 400 are performed by the server 120. As will be apparent to those skilled in the art, the blocks performed by the device 104 are performed via the execution of the application 236 by the processor 200, while the blocks performed by the server 120 are performed via the execution of the application 286 by the processor 250.

At block 405, a device 104 is configured to retrieve and send the identifier of the battery currently connected to the device 104. As shown in FIG. 4, block 405 is typically, although not necessarily, performed upon start-up of the device 104. For example, at the beginning of an operational period such as a shift (or shortly before the beginning of the operational period), the devices 104 may be staged in their operating environments. The staging of the devices typically includes the selection and connection of a battery 116 for each device 104. Following connection of the battery 116 to the device 104, each device 104 powers on and, via the execution of the application 236, performs block 405. At block 405, the processor 200 is configured to retrieve the identifier 232 from the memory of the battery 116 (e.g., from the controller 228). The processor 200 is then configured to transmit the identifier 232 to the server 120, along with an identifier of the device 104 itself.

Figure 5:
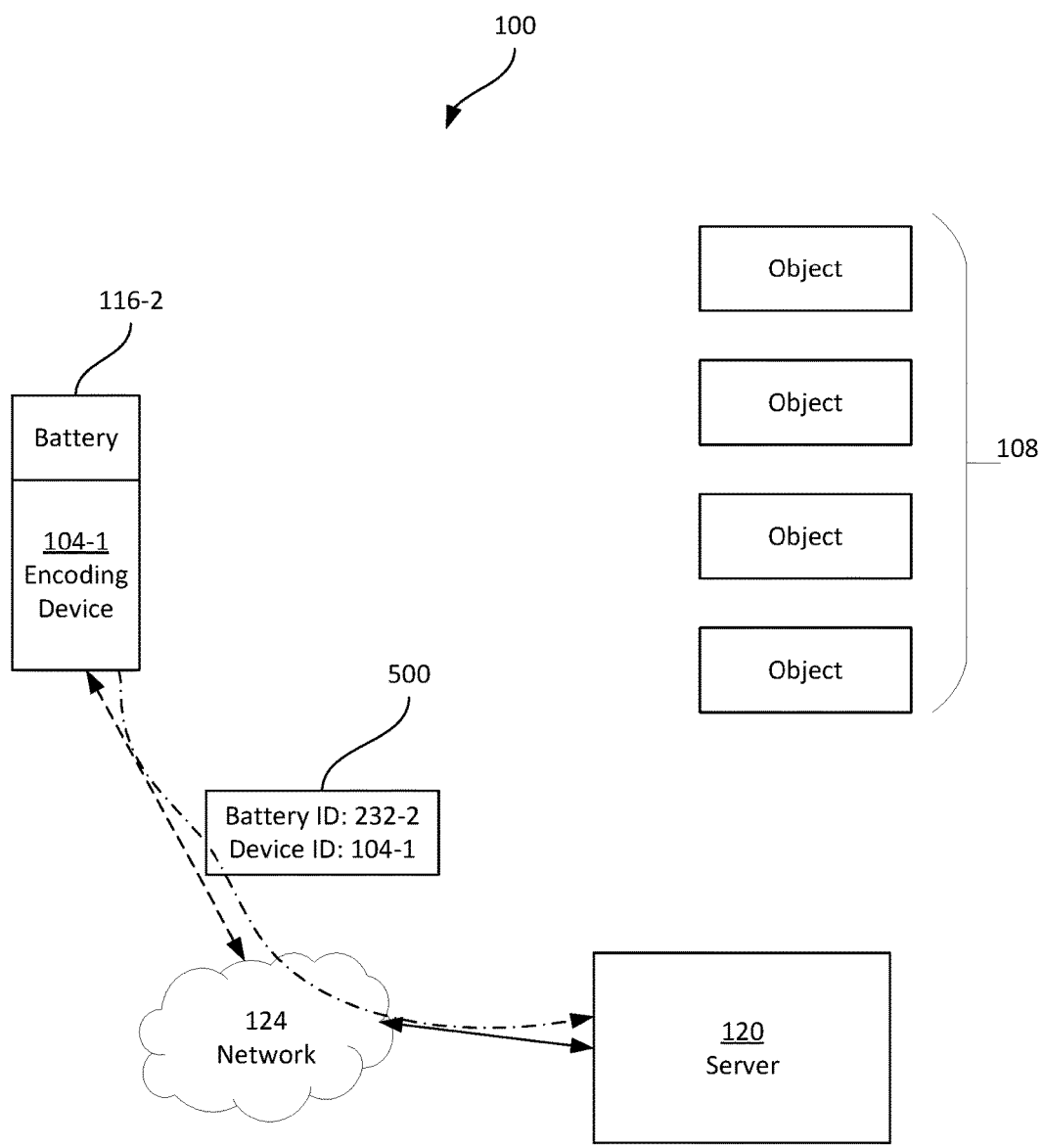
FIG. 5 is partial depiction of the system of FIG. 1 during the performance of the method of FIG. 4.

Turning briefly to FIG. 5, the system 100 is shown with certain components omitted for simplicity of illustration. In particular, the device 104-1 is shown following the above-mentioned staging, having been connected with the battery 116-2. The device 104-1 is therefore configured to transmit a message 500 to the server, containing the identifier of the battery 116-2 ("232-2", in the example illustrated in FIG. 5) and the identifier of the device 104-1 ("104-1", in the illustrated example).

At block 410, the server 120, and specifically the allocation handler 300, is configured to receive the message 500 containing the battery identifier and the device identifier, and to obtain an allocation corresponding to the battery 116-2 based on the message 500 and the repository 290. As noted above, roles are assigned to the devices 104, for example for each operational period. That is, the repository 290 contains an indication of which role is currently assigned to each device 104. Table 1, below, illustrates example role assignments as stored in the repository 290.

TABLE 1

Role Assignments

| Device ID | Role ID | Battery ID |
| --- | --- | --- |
| 104-1 | Warehouse A | |
| 104-2 | Warehouse A | |
| 104-3 | Warehouse B | |

As seen above, the role assignments can correspond to physical locations, which may also entail different operational requirements for the devices 104 assigned to those locations. The operational requirements, such as label types (or any other task, including other encoding tasks) associated with each role, can be stored in the repository, but do not need to be stored in the repository. As will be seen below, the server 120 is configured to determine requirements relevant to battery allocation even in the absence of parameters defining the roles.

At block 410, the server 120 is configured to obtain a battery allocation by retrieving the role currently assigned to the device 104-1, for example from Table 1. The allocation obtained at block 410 is an association between the retrieved role and the battery identifier received in the message 500. That is, in the present example performance of the method 400, the allocation obtained at block 410 is an association between the role identifier "Warehouse A" and the battery identifier "232-2". The server 120 is configured to store the allocation, for example in Table 1 itself, by updating the table as shown below in Table 2:

TABLE 2

Role Assignments (Updated)

| Device ID | Role ID | Battery ID |
|---|---|---|
| 104-1 | Warehouse A | 232-2 |
| 104-2 | Warehouse A | |
| 104-3 | Warehouse B | |

In other words, the server 120 is configured to associate a role with the battery 232-2 based on the role assigned to the device to which the battery 232-2 is currently connected.

At block 415, the server 120 (and specifically the alert generator 312) is configured to retrieve a predicted capacity of the battery 116-2 and a predicted energy consumption associated with the role "Warehouse A". The predicted capacity and energy consumption are retrieved from the repository 290 by the alert generator 312, having been previously determined by the predictor 308 on the basis of data received from the devices 104 by the collector 304. In brief, the predictor 308 is configured to determine the predicted capacity and energy consumption by extrapolating from status data reported by the devices 104. The determination and updating of the predicted capacity and energy consumption by the predictor 308 will be discussed in further detail below.

Figure 6A:
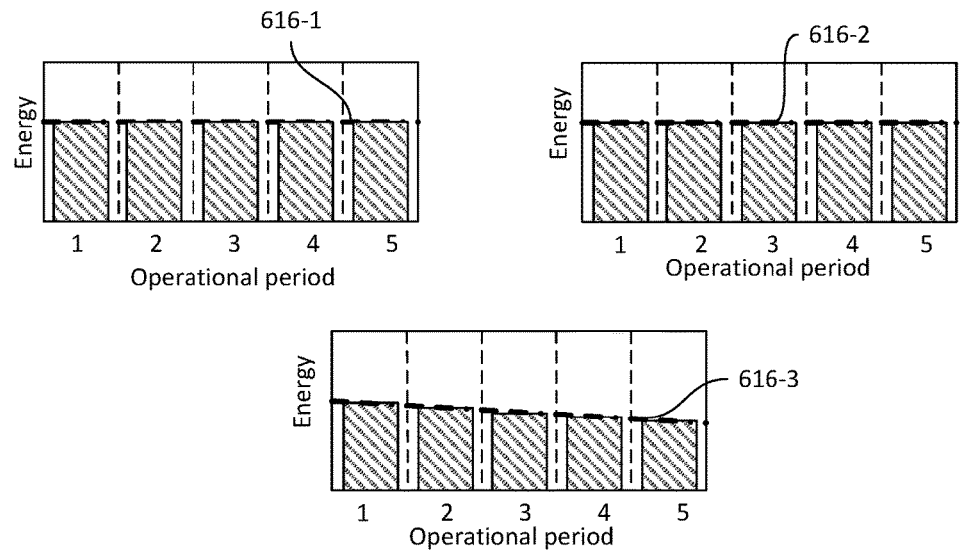
FIGS. 6A-6C depict predicted performance metrics employed during the performance of the method of FIG. 4.

Turning to FIG. 6A, predicted capacities 616-1, 616-2 and 616-3 are shown for each of the batteries 116. The predicted capacities 616 illustrate the expected maximum (i.e., fully charged) energy storage capacity of each battery 116 for at least one future operational period. Each expected maximum capacity is illustrated as a column for the corresponding operational period, and the predicted capacities are trendlines based on the columns. In the present example, the repository 290 stores a plurality of predicted capacities for each battery 116. In particular, predicted capacities are stored for each battery 116, for each of five future operational periods. The horizontal axes of the graphs shown in FIG. 6A depict time, measure in operational periods from the current time. Thus, labels 1-5 indicate the predicted capacities for the five upcoming operational periods (e.g., days, shifts or the like). The vertical axis indicates capacity in the form of a quantity of energy, for example in milliamp hours (mAH).

The predicted capacities need not be stored in the repository 290 in the format shown in FIG. 6A. In other examples, the predicted capacities can be stored as sets of parameters defining the above-mentioned trendlines (e.g. a slope parameter and an offset parameter, defining an offset from the horizontal axis). In further examples, discrete predicted capacity values can be stored corresponding to each of the future time periods (e.g. defining the height of the columns shown in FIG. 6A).

Figure 6B:
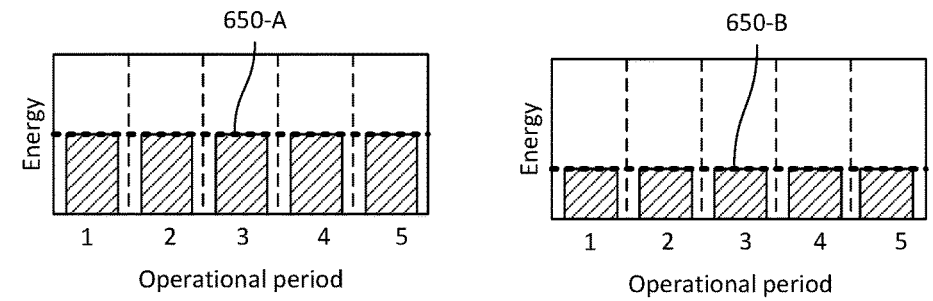

FIG. 6B illustrates the predicted energy consumption for each of the roles noted in Tables 1 and 2. In particular, the predicted energy consumption 650-A corresponds to the role "Warehouse A", and the predicted energy consumption 650-B corresponds to the role "Warehouse B". As with the predicted capacities 616, the predicted energy consumptions 650 indicate predicted energy consumption, for each of at least one (and in the present example, five) future operational periods. The predicted energy consumptions 650 indicate, for each role, how much energy (e.g., in mAH) is expected to be consumed by a device 104 performing that role. In other words, the predicted energy consumptions 650 express how much energy a battery 116 powering a device 104 is expected to supply to the device 104 to support the performance of the corresponding role.

Returning to FIG. 4, in the present example performance of the method 400, at block 415 the server 120 (and particularly the alert generator 312) is configured to retrieve the predicted capacity 616-2 corresponding to the battery 116-2, as well as the predicted energy consumption 650-A corresponding to the role Warehouse A. The server 120 can be configured to retrieve the predictions for any or all of the predicted operational periods, when predictions are available for more than one operational period. Typically, the server 120 is configured to retrieve at least the first predictions (i.e. those corresponding to the label "1" on the horizontal axes shown in FIGS. 6A and 6B).

At block 420, the alert generator 312 is configured to compare the predicted capacity and the predicted energy consumption retrieved at block 415, to determine whether the predicted energy consumption exceeds the predicted capacity. The determination at block 420 may be performed for any one of, or any combination of, the predictions retrieved at block 415. For example, if all five available predictions for each of the capacity and the energy consumption were retrieved at block 415, the determination at block 420 can be repeated for each pair of predictions (i.e., the predicted capacity for operational period 1 is compared with the predicted consumption for operational period 1, and so on until period 5).

Figure 6C:
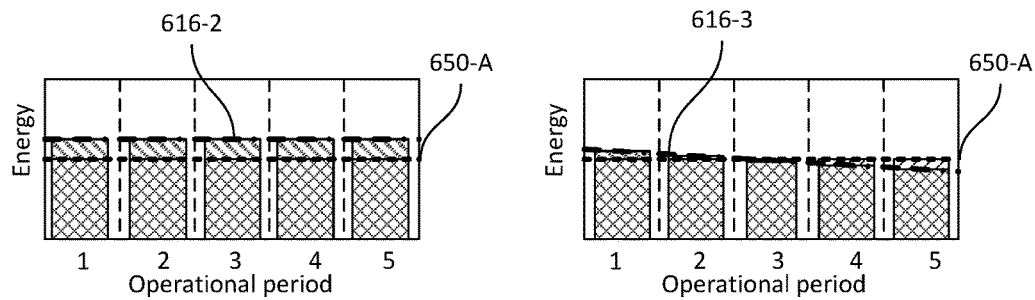

Referring to FIG. 6C, a graphical representation of the comparison at block 420 for the current performance of the method 400 is illustrated. In particular, FIG. 6C shows the predicted capacities 616-2 overlaid with the predicted energy consumptions 650-A. As will be apparent to those skilled in the art, the alert generator 312 need not generate a graphical overlay as shown in FIG. 6C at block 420. Instead, the alert generator 312 can be configured to compare the numerical values illustrated in FIGS. 6A and 6B. As seen in FIG. 6C, the predicted capacities 616-2 all exceed the predicted consumptions 650-A. In other words, the determination at block 420, regardless of how many of the available predictions are assessed, is negative. As shown in FIG. 4, the performance of the method 400 therefore proceeds to a further stage, illustrated in FIG. 7 and discussed in greater detail below.

When, on the other hand, the determination at block 420 is affirmative, the performance of the method 400 proceeds to block 425. For example, if the predicted capacities 616-3—which indicate an expected degradation of capacity for the battery 116-3—were compared with the predicted energy consumptions 650-A, as also illustrated in FIG. 6C, the determination at block 420 would reveal that the capacity of the battery 116-3 is expected to fall below the expected energy consumption for the role Warehouse A on each of the fourth and fifth operational periods (e.g. four shifts in the future). The alert generator 312, under such circumstances, is configured to proceed to block 425, at which the alert generator 312 is configured to determine whether an alternative role is available for which the determination at block 420 (i.e., comparing the predicted capacity of the same battery to the predicted consumption of the alternative role) is negative.

As seen from FIGS. 6A-6C, although the consumption associated with the role Warehouse A will exceed the declining capacity of the battery 116-3 in four shifts, the consumption associated with the role Warehouse B will not exceed the declining capacity of the battery 116-3 in the five future shifts for which predictions are available. Therefore, the determination at block 425 is affirmative and the alert generator 312 proceeds to block 430. When the determination at block 425 is negative (i.e. when all other available roles also indicate predicted consumptions that exceed at least one predicted capacity of the battery 116-3), the alert generator 312 proceeds directly to block 435. When the determination at block 425 indicates that more than one alternative role is available, each available alternative role may be selected at block 430. In other examples, one of the alternative roles may be selected, for example based on a comparison of locations associated with the alternative roles and a current location of the device 104.

At block 430, therefore, the alert generator 312 is configured to select the role Warehouse B as an alternative role. At block 435, the alert generator 312 is configured to generate and send an alert message containing at least an indication of the results of the determination at block 420. When the determination at block 425 is affirmative, the message generated at block 435 also includes an indication of the alternative role selected at block 430. In the example given above of the battery 116-3 and the role Warehouse A, the alert message therefore contains an indication that the battery 116-3 will no longer be suitable for use in the role Warehouse A in four shifts, but that the battery 116-3 is expected to continue to be suitable for use in the role Warehouse B.

In other examples, rather than determining whether an alternative role is available at block 425, the server 120 is configured to determine whether an alternative battery to the battery 116 identified at block 405 is available for use in the role allocated at block 410. For example, the server 120 can be configured, responsive to an affirmative determination at block 420 in connection with the battery 116-3, to retrieve the predicted capacities of one or both of the batteries 116-1 and 116-2 and to determine whether the predicted capacities of either or both of the batteries 116-1 and 116-2 exceed the predicted consumption for the role Warehouse-A. When at least one of the batteries 116-1 and 116-2 are suitable for the role Warehouse-A, the server 120 can be configured, at block 430, to select an alternative battery 116 rather than an alternative role.

The message generated and sent at block 435 is sent, in the present example, to the device 104 from which the battery identifier was received at block 405 (i.e., the device currently powered by the battery whose allocation was assessed via the performance of the method 400). The device 104 is configured, at block 440, to receive and present the message, for example by rendering the message on a display, generating a warning tone by a speaker, or the like. In other examples, the message need not be sent to the device 104, but can rather be stored on the server 120 for display in a console or dashboard application. In further examples, the message may be sent to an administrator computing device (not shown), a battery charging unit, and the like, in addition to or instead of being sent to the device 104.

Figure 7:
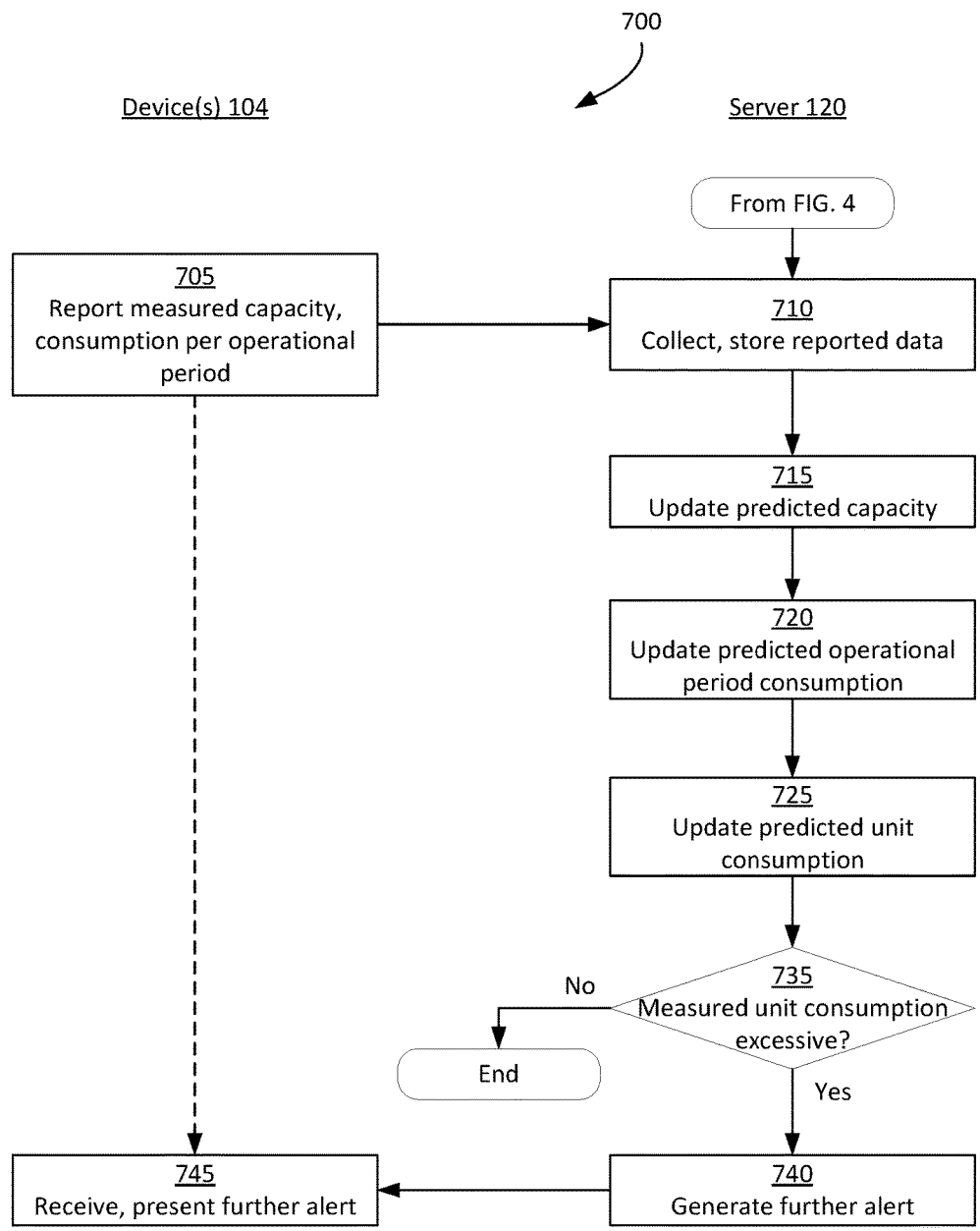
FIG. 7 depicts a method of updating the predicted performance metrics of FIGS. 6A-6C.

Following the performance of the method 400, the server 120 may proceed to a second stage, illustrated in FIG. 7 as a method 700 of generating predictions for battery allocations. The performances of the methods 400 and 700 need not follow each other exactly as illustrated in FIGS. 4 and 7. In general, the method 400 is initiated upon start-up of a device 104, and the method 700 is performed responsive to the operation of any one or more of the devices 104 after start-up. As will therefore be apparent, the performances of the methods 400 and 700 may overlap as different devices interact with the server 120 at different stages of their operations.

At block 705, each device 104 is configured to report status data, as mentioned above, to the server 120. The status data reported to the server 120 includes a data set corresponding to at least one operational period. The devices 104 are configured, in the present example, to store status data during each operational period and to transmit the status data to the server at the end of each operational period. In other examples, the devices 104 may be configured to transmit portions of the status data during the operational period (for example, once per hour during the operational period). In any event, each data set encompasses a single operational period, and includes, for that operational period, an identifier of the battery 116 connected to the device 104 during the operational period, a measured capacity of the battery 116 (e.g. at the beginning of the operational period), and a measured energy consumption over the course of the operational period. The data set can also include, in some examples, a measured count of tasks performed by the device 104 during the operational period (e.g. a count of labels printed, RFID tags written, or the like). The data set can include labels associated with certain measurements. For example, any measurements taken while the device 104 is connected to an external power source during the operational period may be labelled as externally powered. Such measurements may be discarded by the server 120, or weighted differently from the remaining measurements, during the performance of the method 700.

The status data mentioned above can be received directly from the devices 104, as noted above, or from an associated device, such as a charging and/or data cradle into which one or both of the device 104 and battery 116 are placed. The status data may also, in some examples, be relayed from the devices 104 or the associated devices noted above via a relay device, such as an additional handheld computing device (or a further device 104). Further, in some examples the status data need not explicitly indicate certain parameters, such as the measured consumption. Instead, in such examples, the status data may include a plurality (i.e., at least two) of measured capacities for the battery 116, from which the measured consumption is determined.

Although the reporting at block 705 is illustrated as being performed by respective devices 104, in other examples one or both of the measured capacity and consumption are reported by an apparatus other than the device 104. In some examples, the system 100 includes one or more charging stations with which the batteries 116 may be connected for charging (e.g. at the end of an operational period) following disconnection from the devices 104. The batteries 116 may store (e.g. in a memory of the controller 228) the measured capacity and consumption, and transmit the measurements to the server 120 via the charging stations.

At block 710, the server 120, and in particular the collector 304, is configured to receive and store the data sets received from a plurality of the devices 104. The data sets need not be received simultaneously. For example, the collector 304 can be configured to receive the data sets over the course of one or more operational periods, from a plurality of devices 104 operating in a plurality of roles. As will be apparent from the discussion herein, the generation of the predicted capacities and the predicted energy consumption levels typically requires a plurality of measured capacities for each battery 116, as well as a plurality of measured energy consumptions for each role.

The collector 304 is also configured to determine, based on the identifier of each device 104 from which a reported data set was received, the role in which the respective device 104 operated during collection of the data set. The determination of role can be made, for example, by querying the allocation handler 300 which, as discussed above, is configured to establish associations between batteries 116 and roles. Table 3, below, illustrates a plurality of example data sets received from the devices 104 for use in the remainder of the method 700. That is, the contents of Table 3 represents a plurality of performances of block 705 by various devices 104.

TABLE 3

Operational Data Sets

| Period | Battery ID | Role | Capacity (mAH) | Consumption (mAH) | Encoding Tasks |
|---|---|---|---|---|---|
| 1 | 232-1 | Warehouse A | 2500 | 2305 | 1105 |
| 1 | 232-3 | Warehouse B | 2200 | 1910 | 781 |
| 2 | 232-3 | Warehouse A | 2050 | 2300 | 1101 |
| 2 | 232-2 | Warehouse B | 2500 | 1888 | 775 |
| 3 | 232-2 | Warehouse A | 2450 | 2280 | 1100 |
| 3 | 232-1 | Warehouse B | 2500 | 1904 | 782 |

At block 715, the predictor 308 is configured to update the predicted capacity for each battery 116 represented in the received data sets. At block 720, the predictor 308 is configured to update the predicted energy consumption per operational period for each role represented in the received data sets. Further, at block 725, the predictor 308 is configured to update a predicted unit energy consumption for each role represented in the received data sets. In other examples, block 725 can be omitted; in the present example, the determination and/or updating of the predicted unit energy consumption permits additional functionality to be performed by the server 120, as will be described below.

Figure 8A:
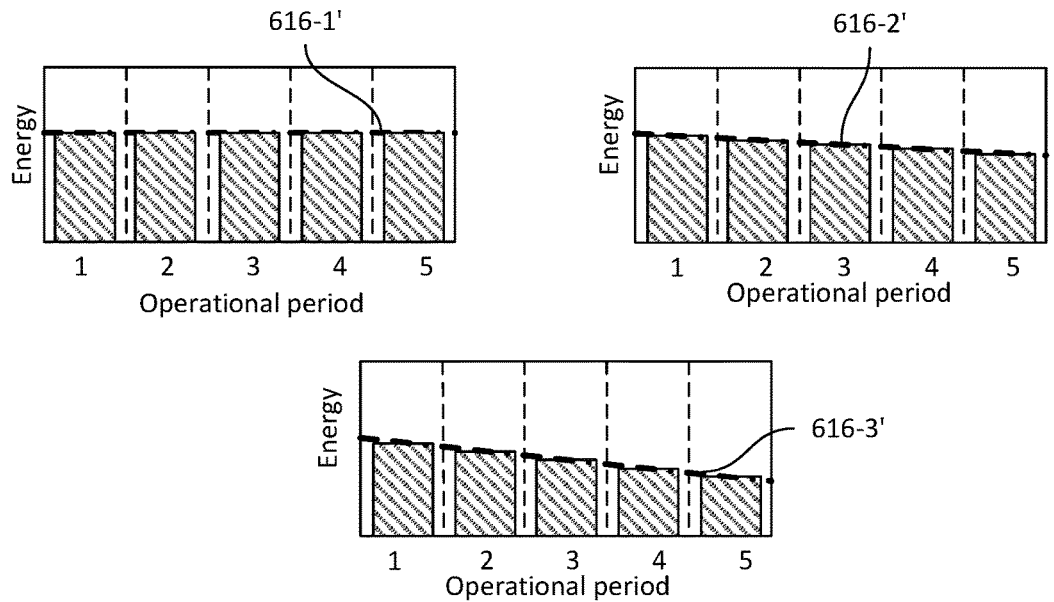
FIGS. 8A-8C depict updated versions of the performance metrics of FIGS. 6A-6C.
Figure 8B:
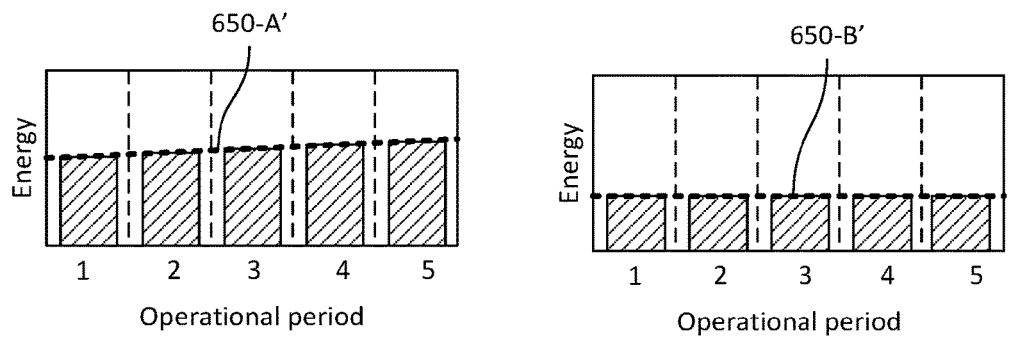

The predictions determined and/or updated at blocks 715, 720 and 725 need not be updated in the order shown in FIG. 7. In some examples, the performance of blocks 715, 720 and 725 can be substantially simultaneous. Each of the above-mentioned predictions is updated based on any suitable extrapolation mechanism. For example, a straight line or a polynomial curve may be fitted to the received data sets (e.g., in addition to previously received data sets used to generate previous predictions). Turning to FIGS. 8A and 8B, updated predictions 616' and 650' are illustrated. As seen, for example, in FIG. 8A, the data sets received at block 710 indicate that the capacity of the battery 116-2 has begun to degrade, while the degradation of the capacity of the battery 116-3 has accelerated. Further, FIG. 8B illustrates that the predicted consumption 650-A' for the role Warehouse A is expected to increase over the following five operational periods.

Figure 8C:
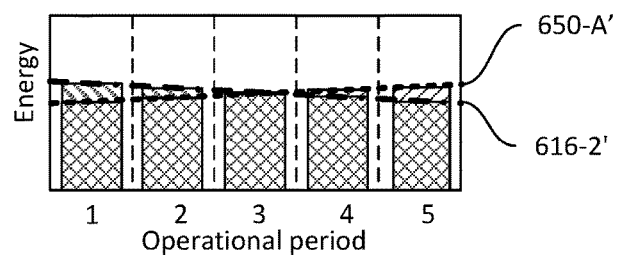

Following the updating of the predictions, the server 120 can return to FIG. 4, for example to receive a further battery identifier at block 410. As shown in FIG. 8C, a subsequent performance of the method 400 associated with the battery identifier 232-2 (i.e., the battery 116-2) will result in an affirmative determination at block 420, as the increasing consumption associated with the role Warehouse A is expected to exceed the decreasing capacity of the battery 116-2.

Returning to FIG. 7, in some examples the server 120, and particularly the alert generator 312, is also configured to generate a further alert under certain circumstances. Specifically, the alert generator 312 is configured to determine, at block 735, whether the data received at block 710 for a given battery indicates a measured unit consumption (i.e. the total consumption in Table 3 divided by the count of encoding tasks in Table 3) that exceeds a predicted unit consumption. To facilitate the determination at block 735, the predictor 308 can also be configured to determine a predicted unit energy consumption for each role based on the data received at block 710. The alert generator 312 is configured to compare the predicted unit energy consumption to the measure unit energy consumption at block 735. If the determination at block 735 is affirmative, the alert generator 312 can be configured to generate a further alert, indicating a potential issue with one or both of the battery 116 identified in the data received at block 710, and the device with which the battery 116 was connected. For example, a defective printer head may consume more energy per label printed than expected. The further alert is transmitted to one or more of the corresponding device, the above-mentioned administrator computing device, and the above-mentioned console or dashboard. When the further alert is sent to the device 104, the device 104 is configured to receive and present the alert at block 745.

Variations to the above systems and methods are contemplated. For example, in addition to generating predictions for operational roles, the server 120 can be configured to generate a plurality of predictions (e.g., predicted energy consumptions) corresponding to each role. For example, a set of predicted energy consumptions may be generated for a given role, each corresponding to a different ambient temperature range. Similarly, predicted capacities for each battery 116 at different temperatures may also be determined, and the determination at block 420 can be based also on a current temperature reported by the device 104 at block 405.

In further examples, the predicted energy consumption for each role may be replaced (rather than supplemented, as in FIG. 7) by the predicted unit energy consumption for each role and a predicted count of tasks (e.g. labels printed) for each role, determined from the measured counts of tasks reported by the devices 104. The determination at block 420, for example, can be performed by retrieving the predicted unit energy consumption (representing consumption per task for the given role) and the predicted task count (representing the expected number of tasks performed in an operational period for the given role) and multiplying them to obtain a total predicted energy consumption for the role. In such embodiments, the application 286 can also be configured to apply an additional offset to the predicted energy consumption (e.g., in addition to the trendline offsets mentioned above in connection with FIG. 6A) representing an expected energy consumption associated not with the tasks, but with other device functions, such as the operation of wireless radios, displays and the like.

In further examples, at least some of the functionality described above as being performed by the server 120 is instead performed by a device 104. For example, the batteries 116 may be placed in a charging station in between operational periods, and the charging station itself may store the measured capacities and consumptions (e.g., by retrieving the measurements from the controller 228 of each battery 116). A device 104 can be configured to establish a connection with the charging station to obtain the measured capacities and consumptions, and to then generate the predicted capacities and consumptions. The device 104 can therefore be configured to perform at least blocks 410-420 for each of the batteries 116 to identify a battery 116 for use. In further examples, the generation or updating of predicted capacity is performed by the device 104 itself, or an associated charging station. For example, a device 104 may be configured to generate a predicted capacity based on a discharge rate detected during an operational period. In such embodiments, the device 104, charging station or the like can be configured to transmit the predicted capacity to the server 120.

In this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", " contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The above description refers to block diagrams of the accompanying drawings. Alternative implementations of the examples represented by the block diagrams include one or more additional or alternative elements, processes and/or devices. Additionally or alternatively, one or more of the example blocks of the diagrams may be combined, divided, re-arranged or omitted. Components represented by the blocks of the diagrams are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations represented by the flowcharts of this disclosure). Some example logic circuits are hardware that executes machine-readable instructions to perform operations (e.g., one or more of the operations represented by the flowcharts of this disclosure). Some example logic circuits include a combination of specifically configured hardware and hardware that executes machine-readable instructions.

The above description refers to flowcharts of the accompanying drawings. The flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations represented by the flowcharts are implemented by machine-readable instructions (e.g., software and/or firmware) stored on a medium (e.g., a tangible machine-readable medium) for execution by one or more logic circuits (e.g., processor(s)). In some examples, the operations represented by the flowcharts are implemented by one or more configurations of one or more specifically designed logic circuits (e.g., ASIC(s)). In some examples the operations of the flowcharts are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) can be stored. Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

As used herein, each of the terms "tangible machine-readable medium," "non-transitory machine-readable medium" and "machine-readable storage device" is expressly defined as a storage medium on which machine-readable instructions are stored for any suitable duration of time (e.g., permanently, for an extended period of time (e.g., while a program associated with the machine-readable instructions is executing), and/or a short period of time (e.g., while the machine-readable instructions are cached and/or during a buffering process)).

Although certain example apparatus, methods, and articles of manufacture have been disclosed herein, the scope of coverage of this patent is not limited thereto. On the contrary, this patent covers all apparatus, methods, and articles of manufacture fairly falling within the scope of the claims of this patent.

The invention claimed is:

1. A method in a server for allocating a rechargeable battery among a plurality of roles performed by a group of devices removably connectable with the rechargeable battery, the method comprising:

for each of the roles, receiving, from a subgroup of the devices, a plurality of data sets corresponding to respective operational periods, each of the data sets including:

an identifier of the rechargeable battery,
a measured capacity of the rechargeable battery, and
a measured energy consumption during the operational period;
determining, based on the measured capacity of the rechargeable battery during the operational periods, a predicted capacity of the rechargeable battery and storing the predicted capacity in association with the identifier of the rechargeable battery;
determining, for each role, a predicted energy consumption based on the measured energy consumptions and storing the predicted energy consumption in association with an identifier of the role;
obtaining an allocation defined by the identifier of the rechargeable battery and an identifier of one of the roles;
comparing the predicted capacity with the predicted energy consumption corresponding to the one of the roles; and
when the predicted energy consumption corresponding to the one of the roles exceeds the predicted capacity, generating an alert,
wherein each of the devices is a label printer, and the label printers are configured to print a different one of a plurality of label types in each of the roles.

2. The method of claim 1, wherein the predicted capacity corresponds to a future operational period.

3. The method of claim 1, wherein the predicted energy consumption corresponds to a future operational period.

4. The method of claim 1, wherein each of the data sets includes a measured count of encoding operations performed during the operational period the method further comprising:
determining, based on the measured energy consumptions and the measured counts of encoding operations corresponding to each of the roles, a measured unit energy consumption for the role;
determining, for each of the role, a predicted unit energy consumption based on the measured unit energy consumptions;
responsive to determining that a further measured unit energy consumption corresponding to a further data set exceeds the predicted unit energy consumption based on the measured unit energy consumptions, generating a further alert.

5. The method of claim 1, wherein obtaining the allocation includes receiving an allocation request from an encoding device.

6. The method of claim 5, wherein the allocation request contains an identifier of the encoding device and the identifier of the rechargeable battery, the method further comprising:
obtaining the identifier of the role based on a device identifier.

7. The method of claim 5, wherein generating the alert comprises sending a message to the encoding device.

8. The method of claim 7, wherein generating the alert further comprises selecting an alternative role for the rechargeable battery and transmitting the alternative role in the message.

9. A server for allocating a rechargeable battery among a plurality of roles performed by a group of devices removably connectable with the rechargeable battery, the server comprising:

a collector configured to: for each of the roles, receiving, from a subgroup of the devices, a plurality of data sets corresponding to respective operational periods, each of the data sets including:
an identifier of the rechargeable battery,
a measured capacity of the rechargeable battery, and
a measured energy consumption during the operational period;
a predictor configured to:
determine, based on the measured capacity of the rechargeable battery during operational periods, a predicted capacity of the rechargeable battery and storing the predicted capacity in association with the identifier of the rechargeable battery; and
determine, for each role, a predicted energy consumption based on the measured energy consumptions and storing the predicted energy consumption in association with an identifier of the role;
an allocation handler configured to obtain an allocation defined by the identifier of the rechargeable battery and an identifier of one of the roles; and
an alert generator configured to:
compare the predicted capacity with the predicted energy consumption corresponding to the one of the roles;
when the predicted energy consumption corresponding to the one of the roles exceeds the predicted capacity, generate an alert,
wherein each of the devices is a label printer and the label printers are configured to print a different one of a plurality of label types in each of the roles.

10. The server of claim 9, wherein the predicted capacity corresponds to a future operational period.

11. The server of claim 9, wherein the predicted energy consumption corresponds to a future operational period.

12. The server of claim 9, wherein each of the data sets includes a measured count of encoding operations performed during the operational period the predictor further configured to:
determine, based on the measured energy consumptions and the measured count of encoding operations corresponding to each role, a measured unit energy consumption for the role;
determine, for each role, a predicted unit energy consumption based on the measured unit energy consumptions;
the alert generator further configured to, responsive to determining that a further measured unit energy consumption corresponding to a further data set exceeds the predicted unit energy consumption based on the measured unit energy consumptions, generate a further alert.

13. The server of claim 9, the allocation handler configured to obtain the allocation by receiving an allocation request from an encoding devices.

14. The server of claim 13, wherein the allocation request contains an identifier of the encoding device and the identifier of the rechargeable battery, the allocation handler configured to obtain the identifier of the role based on a device identifier.

15. The server of claim 13, the alert generator further configured to send a message to the encoding device.

16. The server of claim 15, the alert generator further configured to select an alternative role for the rechargeable battery and transmit the alternative role in the message.

17. A method in a server for allocating a rechargeable battery among a plurality of roles performed by a group of devices removably connectable with the rechargeable battery, the method comprising:

for each of the roles, receiving, from a subgroup of the devices, a plurality of data sets corresponding to respective operational periods, each of the data sets including:
an identifier of the rechargeable battery,
a measured capacity of the rechargeable battery,
a measured energy consumption during the operational period, and
a measured count of encoding operations performed during the operational period;
determining, based on the measured capacity of the rechargeable battery during operational periods, a predicted capacity of the rechargeable battery and storing the predicted capacity in association with the identifier of the rechargeable battery;
determining, for each role, a predicted energy consumption based on the measured energy consumptions and storing the predicted energy consumption in association with an identifier of the role;
obtaining an allocation defined by the identifier of the rechargeable battery and an identifier of one of the roles;
comparing the predicted capacity with the predicted energy consumption corresponding to the one of the roles;
when the predicted energy consumption corresponding to the one of the roles exceeds the predicted capacity, generating an alert;
determining, based on the measured energy consumptions and the measured encoding operation counts corresponding to each role, a measured unit energy consumption for the role;
determining, for each role, a predicted unit energy consumption based on the measured unit energy consumptions; and
responsive to determining that a further measured unit energy consumption corresponding to a further data set exceeds the predicted unit energy consumption based on the measured unit energy consumptions, generating a further alert.

18. A server for allocating a rechargeable battery among a plurality of roles performed by a group of devices removably connectable with the rechargeable battery, the server comprising:

a collector configured to: for each of the roles, receiving, from a subgroup of the devices, a plurality of data sets corresponding to respective operational periods, each of the data sets including:
an identifier of the rechargeable battery,
a measured capacity of the rechargeable battery, and
a measured energy consumption during the operational period;
a predictor configured to:
determine, based on the measured capacity of the rechargeable battery during operational periods, a predicted capacity of the rechargeable battery and storing the predicted capacity in association with the identifier of the rechargeable battery;
determine, for each role, a predicted energy consumption based on the measured energy consumptions and storing the predicted energy consumption in association with an identifier of the role;
determine, based on the measured energy consumptions and the measured encoding operation counts corresponding to each role, a measured unit energy consumption for the role; and
determine, for each role, a predicted unit energy consumption based on the measured unit energy consumptions;
an allocation handler configured to obtain an allocation defined by the identifier of the rechargeable battery and an identifier of one of the roles; and
an alert generator configured to:
compare the predicted capacity with the predicted energy consumption corresponding to the one of the roles; and
when the predicted energy consumption corresponding to the one of the roles exceeds the predicted capacity, generate an alert; wherein each data set includes a measured count of encoding operations performed during the operational period; and
responsive to determining that a further measured unit energy consumption corresponding to a further data set exceeds the predicted unit energy consumption based on the measured unit energy consumptions, generate a further alert.

* * * * *